*J. Thomson,*
*Revolving Rake.*

No. 95852.  Patented Oct. 12. 1869.

Witnesses:  Inventor:
Leopold Ouch  Jas. Thompson
  Alexander A. Mason
    Attys

United States Patent Office.

JAMES THOMPSON, OF BRIDGEPORT, ILLINOIS.

Letters Patent No. 95,852, dated October 12, 1869.

IMPROVEMENT IN HORSE-RAKES.

The Schedule referred to in these Letters Patent and making part of the same.

*To all whom it may concern:*

Be it known that I, JAMES THOMPSON, of Bridgeport, in the county of Lawrence, and in the State of Illinois, have invented new and useful Improvements in Horse Hay-Rakes; and do hereby declare that the following is a full, clear, and exact description thereof, reference being had to the accompanying drawings, and to the letters of reference marked thereon.

The nature of my invention consists in the construction and general arrangement of a "horse hay-rake," as will be hereinafter fully set forth.

In order to enable others skilled in the art to which my invention appertains to make and use the same, I will now proceed to describe its construction and operation, referring to the annexed drawings, which form a part of this specification, and in which—

Figure 1:
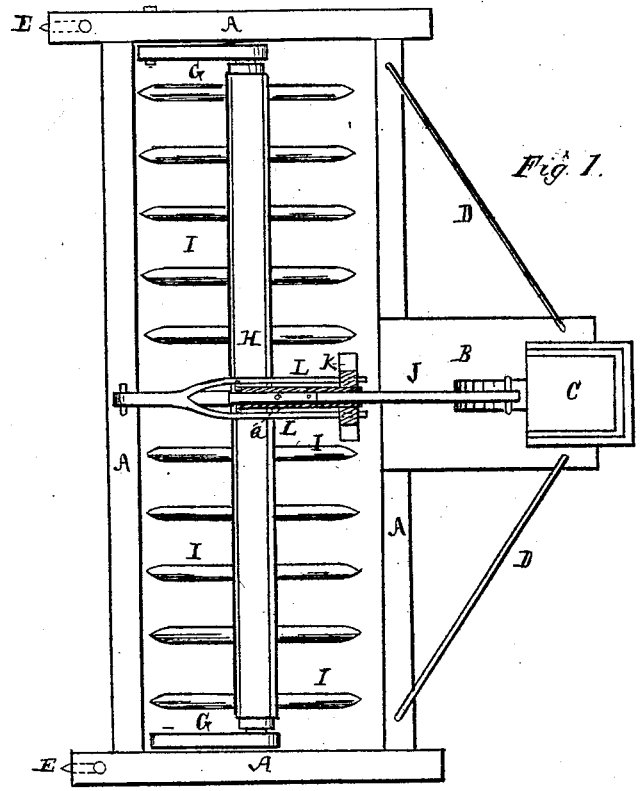
Figure 2:
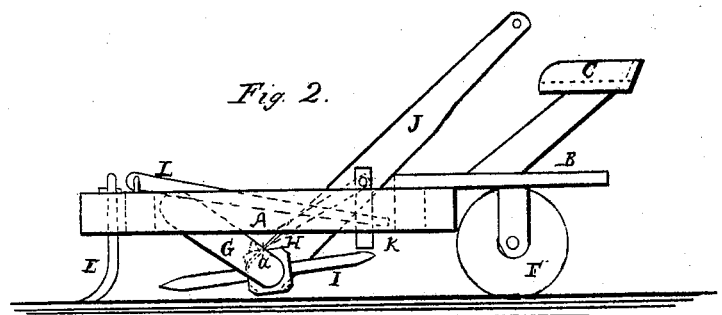

Figure 1 is a plan view, and
Figure 2, a side elevation.

A represents a frame, of suitable dimensions, having on its rear side a platform, B, on which the driver's seat C is placed.

This platform is braced to the frame by braces D D, and the frame, with platform and seat, is supported by two runners, E E, one at each end, on the front side of the machine, and by a wheel, F, under the centre of the platform B.

At each end of the frame, on the inside, near the front, is pivoted an arm, G, between the lower ends of which is pivoted the rake-head H.

The teeth I I pass through the rake-head H, and are constructed in any of the known and usual ways.

The handle J, which extends back to near the seat C, is by a loop connected with the rake-head H, said loop passing around the rake-head, so that the rake will revolve in the same.

To this handle is pivoted a small frame, K, which rests on the ends of the two centre teeth of the rake, preventing the rake from revolving.

To the front of the frame A is pivoted a forked rod, L, the ends of which are pivoted in the small frame K. By raising the handle J, the forked rod L will move the frame K toward the rear, off from the teeth, allowing the rake to revolve.

To each side of the handle J is secured a spring-bar, *a*, the lower ends of which catch against lugs *e e*, on the rake-head H, preventing the rake from turning backward.

Having thus fully described my invention,
What I claim as new, and desire to secure by Letters Patent, is—

1. The arrangement of the frame A, platform B, seat C, braces D D, runners E E, and wheel F, all substantially as shown and described.

2. The arrangement of the frame A, with runners E, pivoted arms G G, rake H, handle J, spring-bars *a a*, and lugs *b b*, all constructed and operating substantially as specified.

3. The combination of the handle J, frame K, and forked rod L, all constructed and arranged substantially as and for the purposes herein set forth.

In testimony that I claim the foregoing, I have hereunto set my hand, this 8th day of March, 1869.

JAMES THOMPSON.

Witnesses:
   JAMES A. PIPER,
   GEORGE W. LEHR.